C. W. CONNER.
SOLID BIFOCAL LENS.
APPLICATION FILED OCT. 23, 1902.

932,965.

Patented Aug. 31, 1909.
2 SHEETS—SHEET 1.

WITNESSES:
O. M. McLaughlin
W. M. Gentle

INVENTOR.
Charles W. Conner.
BY
V. H. Lockwood
ATTORNEY.

C. W. CONNER.
SOLID BIFOCAL LENS.
APPLICATION FILED OCT. 23, 1902.
932,965.
Patented Aug. 31, 1909.
2 SHEETS—SHEET 2.
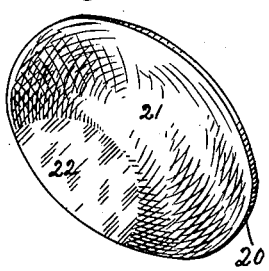
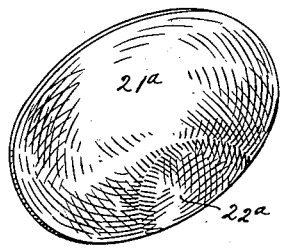
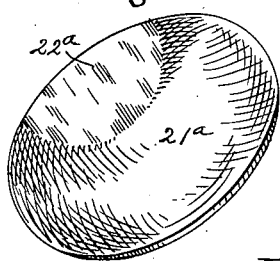
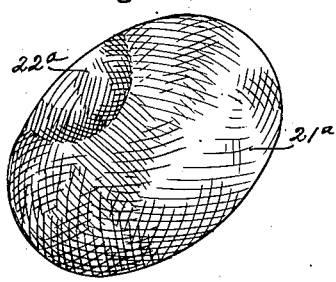
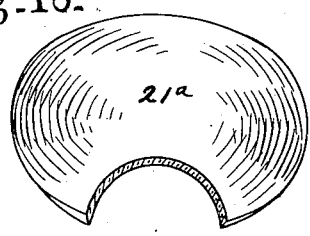
Inventor
Charles W. Conner.
Witness
W. M. Gentle.
N. Allemong.
By V. H. Lockwood
Attorney

UNITED STATES PATENT OFFICE.

CHARLES W. CONNER, OF INDIANAPOLIS, INDIANA.

SOLID BIFOCAL LENS.

932,965.   Specification of Letters Patent.   Patented Aug. 31, 1909.

Application filed October 23, 1902. Serial No. 126,378.

*To all whom it may concern:*

Be it known that I, CHARLES W. CONNER, a citizen of the United States, residing at Indianapolis, in the county of Marion and State of Indiana, have invented certain new and useful Improvements in Solid Bifocal Lenses, of which the following is a specification.

The object of this invention is to provide a bifocal lens made from a single piece of glass having on one face thereof two visual surfaces of different dioptrics, the upper surface being the distance field and the lower surface being the near or reading field, and having an arched division separating the two fields, the lens at the curved line of joinder of the two fields having uniform thickness through both fields. Such a bifocal lens avoids the difficulties and the expense of bifocal lenses formed of two or more pieces of glass, and it also presents a smooth surface at the junction or division between the two fields, so as to render the lens practically free at that point from any prismatic effects.

The nature of the invention will be understood from the following description and claim.

Figure 1:
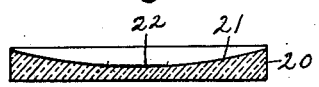
Figure 2:
Figure 3:
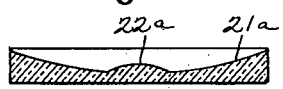
Figure 4:
Figure 5:
Figure 6:
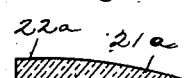
Figure 7:
Figure 8:

In the drawings Figure 1 is a central sectional view of a plano-concave lens having a plane surface conjoining with the concave surface. Fig. 2 is a similar section of a lens produced from the lens shown in Fig. 1, the plano-lens surface, which conjoins the concave lens surface, being shown at the periphery of the lens. Fig. 3 is a view similar to Fig. 1 showing a concave surface or minus lens with a plus lens conjoining therewith. Fig. 4 is a sectional view of a lens cut from the lens shown in Fig. 3. Fig. 5 is a view similar to Fig. 1 showing a convex or plus lens with a plano-lens surface conjoining therewith. Fig. 6 is a sectional view of a lens cut from the lens shown in Fig. 5. Fig. 7 is a view similar to Fig. 1 showing a plus lens surface having a plus lens surface of different and greater curvature conjoining therewith. Fig. 8 is a sectional view of a lens cut from the lens shown in Fig. 7. Fig. 9 is the same as Fig. 2 with the unfinished side of the lens finished in the usual way. Fig. 10 is a perspective view of the lens shown in Figs. 1, 2 and 9, finished. Fig. 11 is a perspective view of the minor field of the lens shown in Figs. 1, 2, 9 and 10 broken away substantially at the junction between the two fields. Fig. 12 is the same as Fig. 4 with the opposing unfinished side of the lens finished in the usual way. Fig. 13 is a perspective view of the finished lens shown in Figs. 3, 4 and 12. Fig. 14 is the same as Fig. 6 with the opposing unfinished side finished in the usual way. Fig. 15 is a perspective view of the lens shown in Figs. 5, 6 and 14, finished. Fig. 16 is the same as Fig. 8 with the opposing or unfinished side finished in the usual way. Fig. 17 is a perspective view of the lens shown in Figs. 7, 8 and 16 in finished form. Fig. 18 is a perspective view of the lens as shown in Fig. 16 with the minor field broken away substantially at the line of junction between the two fields.

The drawings in Figs. 1 to 8 illustrate several forms or blanks which said bifocal lens may assume in connection with an opposing plane surface, as the conformation of the opposing surface is immaterial to this invention, for the invention lies in the peculiar relative positions of the two conjoining lens surfaces on one side of the lens. The finished form of such lens is illustrated in the remaining figures in the drawings.

In Figs. 1, 2, 9, 10 and 11, 20 indicates the body of the lens, while 21 indicates a minus surface, and 22 indicates a plano-surface conjoining therewith. The other figures illustrate the other types of lenses, in which the larger visual surface is marked 21ª and the smaller surface 22ª.

Figs. 1, 3, 5, and 7 illustrate blanks in which the surface 22 or 22ª is central, and the surface 21 or 21ª surrounds and is concentric with said surface 22 or 22ª. By removing one side portion of each of said blanks, the lens or blanks shown in Figs. 2, 4, 6, and 8 result, the surface 22 being at one margin of said lens or blank. This more fully appears in another application for Letters Patent of the United States by me, Serial No. 153,697, filed April 21, 1903, for improvements in the method of producing bifocal lenses. When the unfinished surface of the lens, as shown in Figs. 2, 4, 6 and 8, is ground or formed as desired, the finished lenses shown in Figs. 9, 10, 12, 13, 14, 15, 16 and 17 result. The finishing of the unfinished surfaces in said lenses, as shown in Figs. 2, 4, 6 and 8, is well understood in the art and may be accomplished by any desired means. In said finished lenses the upper and larger visual surface may constitute the distance field, and the lower and smaller visual surface the reading or near field, and there is a curved line of joinder between said two surfaces or fields, and the lens at such junction is of uniform thickness, whereby there is a smooth and even surface at the junction of the two fields and the division is practically free from any prismatic effects.

The lenses herein shown and described may be produced in any desired manner or by any preferred means, one such means, however, being set forth in Letters Patent of the United States No. 836,486, granted Nov. 20, 1906.

What I claim as my invention and desire to secure by Letters Patent is:

A bifocal lens comprising one piece of glass having an upper distance field, a lower and smaller near field, and an arched division separating the two fields, but the lens at the curved line of joinder of the upper and lower fields having a uniform thickness through both fields, whereby the said division is practically free from prismatic effects.

In witness whereof I have hereunto set my hand and seal at Indianapolis, Indiana, this 20th day of October, A. D. one thousand nine hundred and two.

CHARLES W. CONNER. [L. S.]

Witnesses:
ARTHUR M. HOOD,
JAMES A. WALSH.